United States Patent [19]
Flickner et al.

[11] Patent Number: 5,136,660
[45] Date of Patent: Aug. 4, 1992

[54] APPARATUS AND METHOD FOR COMPUTING THE RADON TRANSFORM OF DIGITAL IMAGES

[75] Inventors: Myron D. Flickner, San Jose, Calif.; Eric B. Hinkle, Atlanta, Ga.; Jorge L. C. Sanz, San Jose, Calif.

[73] Assignee: International Business Machines Corporation, Armonk, N.Y.

[21] Appl. No.: 421,270

[22] Filed: Oct. 13, 1989

[51] Int. Cl.$^5$ .................... G06K 9/32; G06F 15/00
[52] U.S. Cl. ................... 382/46; 364/413.21
[58] Field of Search .............. 382/6, 46; 364/143.21

[56] References Cited

U.S. PATENT DOCUMENTS

| | | | |
|---|---|---|---|
| 4,328,555 | 5/1982 | Nussbaumer | 364/726 |
| 4,506,327 | 3/1985 | Tam | 364/413 |
| 4,633,398 | 12/1986 | Gullberg et al. | 364/413.21 |
| 4,646,256 | 2/1987 | Bracewell | 364/725 |
| 4,930,076 | 5/1990 | Meckley | 364/143.21 |

OTHER PUBLICATIONS

Shepp et al., Computerized Tomography: The New Medical X-Ray Technology American Mathematical Monthly, vol. 85, No. 6, Jun.-Jul. 1978, pp. 420-439.
Hinkle et al., PPPE: New Life for Projection-Based Image Processing, IBM Research Report RJ 5115, Apr. 22, 1986.
Ohyama et al., Discrete Radon Transform in a Continuous Space, JOSA, vol. 4, No. 2, Feb. 1987.
Beylkin, Discrete Radon Transform, IEEE Trans. on Acoustics, Speech, and Signal Processing, vol. ASSP-35, No. 2, Feb. 1987.
Sanz et al., Radon and Projection Transform-Based Computer Vision, Springer-Verlag, Copyright 1988.

Primary Examiner—Stephen Brinich
Attorney, Agent, or Firm—Baker, Maxham, Jester & Meador

[57] ABSTRACT

In a digital Radon transform processor, a Radon projection of a pixellated digital image is obtained by providing the digital image in raster scanned format, and, for each image pixel, determining a processor storage location which corresponds to a ray along which a line integral of the projection is taken. Then, for that storage location, the length of the portion of the corresponding ray which intersects the pixel is multiplied by the pixel intensity and the contents of the storage location are incremented by the product.

3 Claims, 6 Drawing Sheets

APPARATUS AND METHOD FOR COMPUTING THE RADON TRANSFORM OF DIGITAL IMAGES

BACKGROUND OF THE INVENTION

The invention is in the field of digital image processing and particularly concerns a parameterized process for obtaining the Radon transform of a digital image having a raster-scanned format.

In image display technology, a raster display presents an image as a set of component picture elements ("pixels" or "pels"). The raster forming the image includes an array of pixels arranged generally into horizontal raster lines or rows of pixels. Columns are also defined on the raster, thereby establishing a two-dimensional matrix of pixels which fill the image display area. The image is generated by scanning the picture elements sequentially, line-by-line from a top corner of the display area to the bottom diametric corner. The process then repeats by retracing to the top corner of the matrix.

A raster scan image on a display area is formed by modulation of a beam which is scanned over the raster, with the intensity of the beam being modulated at each pixel location according to the contribution which the pixel makes to the entire image.

In the representation of an image by a digitized raster, storage is provided in the form of a pixel map which generally has a one-to-one correspondence between individual storage locations and pixel locations in the raster. Each pixel storage location contains a multi-bit digital representation (usually, a byte) of image intensity at the pixel location.

The raster format of a digitized image supports high-speed processing of the represented image by any of a number of discrete transform methods which produce intermediate information forms amenable to such processing. Among the best known is the discrete fourier transform (DFT) which can be conveniently implemented in a pipelined architecture to obtain high-speed transformation of a digital image to fourier space.

An especially important transform employed for the analysis of a digitized image is the Radon transform which is applied in medical diagnosis, for example, in the form of computerized tomography. Other applications of the Radon transform in which a two-dimensional object is reconstructed from a set of one-dimensional projections, include radio astronomy, electron microscopy, optical interferometry, and geophysical exploration. Recently, the Radon transform has also been shown to offer advantages for general image processing, in which a digital image must be transformed into Radon space. The significant impact on various machine vision problems of Radon space representation and manipulation has been shown, for example, in the publication by J. L. C. Sanz, et al., entitled "Radon and Projection Transform-Based Computer Vision", Springer-Verlag, 1988. This publication teaches the rapid computation of an approximation to the Radon transform of digital images In Ohyama, et al "Discrete Radon Transform in a Continuous Space", JOSA, February 1987, pp. 318–324, it is asserted that use of a translated rectangle function to synthesize the Radon projection of an image gives an exact result. Therefore, an apparatus and procedure that produces an exact result of the Radon transfer for an image model that consists of a translated rectangle would be a welcome advance in the art.

SUMMARY OF THE INVENTION

The invention relates to an improved method for transforming raster-scanned digital images into counterpart representations in Radon space. The counterpart representations are called projections. These representations are generated by rays whose line integrals form the desired Radon projection. It was observed that an accurate transformation lies in the use of rectangular approximation functions to characterize the rays.

Therefore, it is an objective of this invention to provide an improved method for transforming a raster-scanned digital image into Radon space projections.

Achievement of this objective provides the advantage that such a method is amenable to computer pipeline implementation, because the digital image is processed in raster scan order.

These and other objectives and advantages of the invention will become evident when the following detailed description is read in conjunction with the below-described drawings.

DESCRIPTION OF THE PREFERRED EMBODIMENT

The Radon transform of a two-dimensional function f(xy) is defined as the two-dimensional function $P_\Theta(z)$, where:

$$P_\Theta(z) = \int_{-\infty}^{\infty} \int_{-\infty}^{\infty} f(x,y)\delta(x\cos\Theta + y\sin\Theta - z)dxdy \quad (1)$$

For given values of z and $\Theta$, equation (1) represents the line integral of f(x,y) along a line at an angle $\Theta$ with y-axis, which is located at a distance z in the origin of a projection axis. The set of all such line integrals at the orientation $\Theta$ is referred to as a "projection" of f(x,y) at that orientation. The set of line integrals yields the two-dimensional Radon transform of f(x,y). See FIG. 1 for understanding of equation (1).

Figure 1:
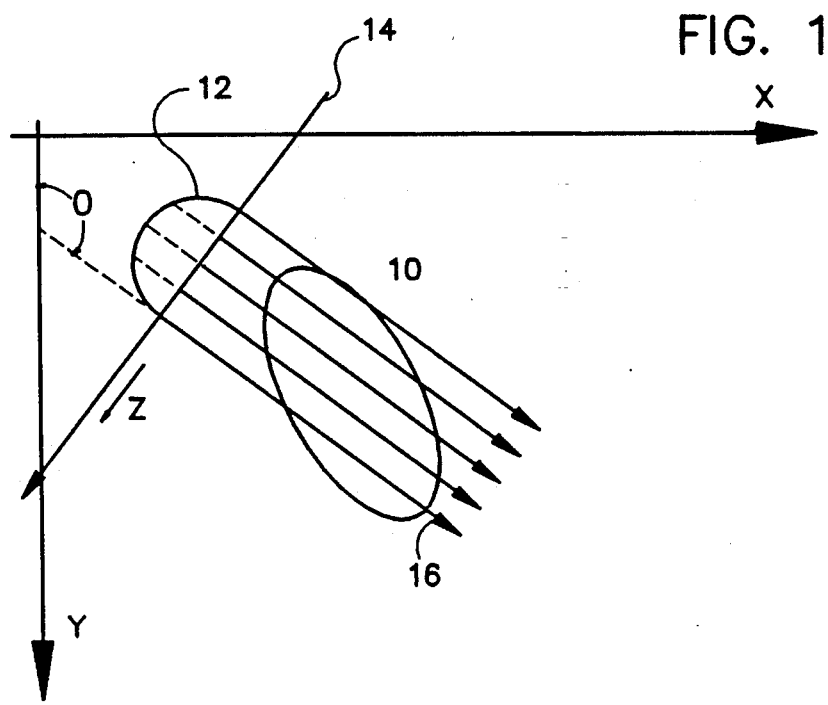
FIG. 1 illustrates Radon projection of an elliptical function.

In FIG. 1, an arbitrary two-dimensional image plane is described by mutually perpendicular x and y axes. The image in the x,y universe is an elipse image 10. The elipse 10 is described by the function f(x,y) in the usual form for two-dimensional representation. The projection of the image 10 is indicated by reference numeral 12 which is illustrated as being imaged with reference to a projection axis 14. Projection 12 is constructed by integrating all of the line integrals of the function describing the image 10, the integrals being taken along lines, or rays, one of which is indicated by 16. Each of the rays has an angle $\Theta$ with the y axis. Thus, in FIG. 1, the projection 12 is a two-dimensional Radon transform of a function representing the image 10. In this regard, the curve 12 can be said to be the Radon projection of the image 10.

Figure 2:
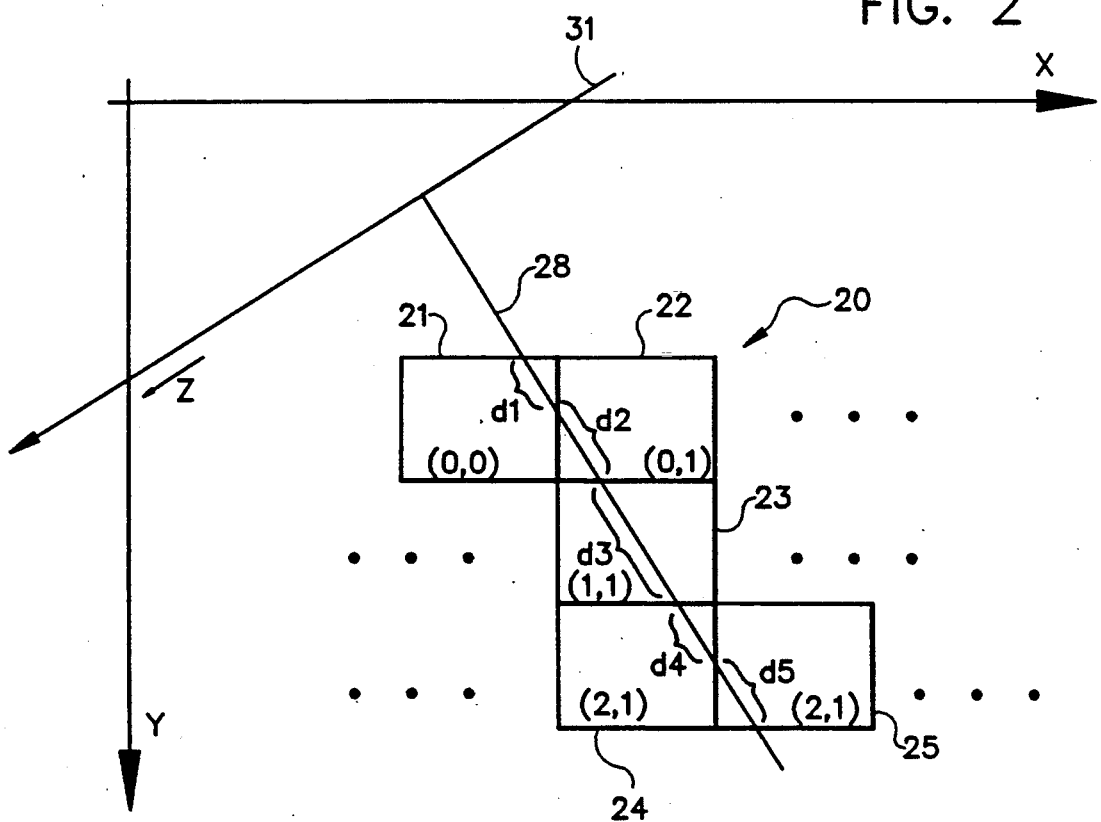
FIG. 2 provides a geometrical interpretation of how a Radon line integral is computed when a raster-scan digital image is transformed.

It is asserted now that the image of FIG. 1 is not continuous, but rather is composed of pixels arranged in a raster. Relatedly, the image is referred to as "digital" image and is described by a function f(i,j). Computation of a digital approximation to the line integrals of FIG. 1 is assisted by modeling the image 10 as a grid of rectangle functions, the grid corresponding to the raster of pixels. This model is well estimated by equation (2), wherein:

$$P_\Theta(z) = \Theta d_{pel} * graylevel_{pel} \quad (2)$$

where the asterisk denotes multiplication and the summation is over all pixels intercepted by the ray z, such that $z = x\cos\Theta + y\sin\Theta$. The discrete version of this projection is given by quantizing z appropriately. Refer to FIG. 2 for a geometrical interpretation of equation (2).

In FIG. 2, a digital image is represented in the x,y universe by a raster of pixels 20. A portion of the raster 20 includes pixels 21-25. Each pixel is illustrated by coordinate points (r,c) wherein t refers to the row, and c to the column of the raster where the pixel is located. Thus, pixel 21 is in row 0, column 0 of the raster 20. Each pixel has an intensity, which may be represented in gray-scale form. The ray 28 comprises one of the rays along which a line integral of the image represented by the raster 20 is to be obtained. In the practice of the invention, the line integral along the ray 28 is obtained by summation of all of the line integral segments of the ray. A line integral segment is understood to be the length of the portion of the ray 28 which intercepts a respective pixel, multiplied by the intensity of the intercepted pixel. Thus, to obtain the line integral along the ray 28, the ray segment lengths $d_1$, $d_2$, $d_3$, $d_4$, $d_5$, etc., must be found, and each multiplied by the intensity of the pixel which it intercepts. The resulting products are summed to obtain the line integral for the ray. The set of all such line integrals defines a set of points along the projection axis 31 which establish the projection of the image. Conceptually, the line integrals can be represented by a set of histograms along the projection axis 31 whose tips are connected to form the projection of the image. The smoothness of the projection is determined by the spacing between the histograms.

The location of a line integral on the projection axis 31 corresponds with the interception of the axis by the ray which generates the integral; this parameter is referred to as the z-intercept of the ray. As illustrated, the magnitude of z increases in the direction of the y axis from the right hand quadrants of the x-y universe.

The last consideration with respect to FIGS. 1 and 2 is that Radon transformation involves the determination of a family of projections, each for a respective value of the angle $\Theta$. It should be evident to those skilled in the art of digital image processing that architectural parallelism of a Radon transform processor can be exploited to concurrently conduct the calculations at all values of $\Theta$ by sending the digital image through a pipeline at each stage of which a projection for a particular value of $\Theta$ is calculated.

Efficient computation of a projection at any value of $\Theta$ for a digital image using the approximation of FIG. 2 is provided in this invention in either floating or fixed point calculation. In either case, consideration of ray summation computation would appear to require random access of a memory in which a digital image is stored. As is known, random access can result in decreased throughput of a parallel transform processor. However, by exploiting the raster form of the digital image, random access to the image can be avoided and the pipelining of computations of many projections at different orientations of $\Theta$ can be done in one pass-through of the raster which represents the image. In this regard, "raster processing" of the digital image refers to performing the transform in an algorithmic sequence corresponding to the raster sequence imposed on the pixels which comprise the digital image.

To use raster processing for computation of a projection in any stage of a processing pipeline requires the maintenance and accumulation of partial sums of all of the rays at each value of $\Theta$. As each pixel in the digital image is accessed in sequence, the appropriate ray sums for the rays that intersect that pixel are updated. In the discussion following, the storage location for a partial ray sum is referred to as a "bucket". Thus, with reference, once again, to FIG. 2, the partial sum for the ray 28 at the value of 8 for the projection involves accumulating the ray segment length/intensity products for the pixels in the raster 20 in the sequence with which those pixels occur. Thus, assuming that the pixel array 20 is addressed in row order beginning with row 0, the partial sum for the ray 28 will first store the product $d_1$ multiplied by the intensity of the pixel 21, and will add to that, in sequence, the products of $d_2$ and the intensity of pixel of 22, $d_3$ and the intensity of pixel 23, $d_4$ and the intensity of pixel 24, $d_5$ and the intensity of pixel 25, and so on. Assuming provision of storage for the partial ray sums, a unique "bucket" will be provided in storage for the accumulating ray sum of the ray 28.

Once an image is transformed using rays to map the image into a projection in Radon space, further processing of the counterpart Radon image is contemplated, for example, to ascertain image object positions or to filter the projection to reduce image noise.

THE INVENTION

The invention solves two distinct problems encountered in the Radon transformation of a digital image represented by a raster of pixels. The first problem is that of determining which bucket or buckets are to be updated for each pixel. The second problem has to do with determination of the length or lengths of ray intersections with each pixel.

Figure 3:
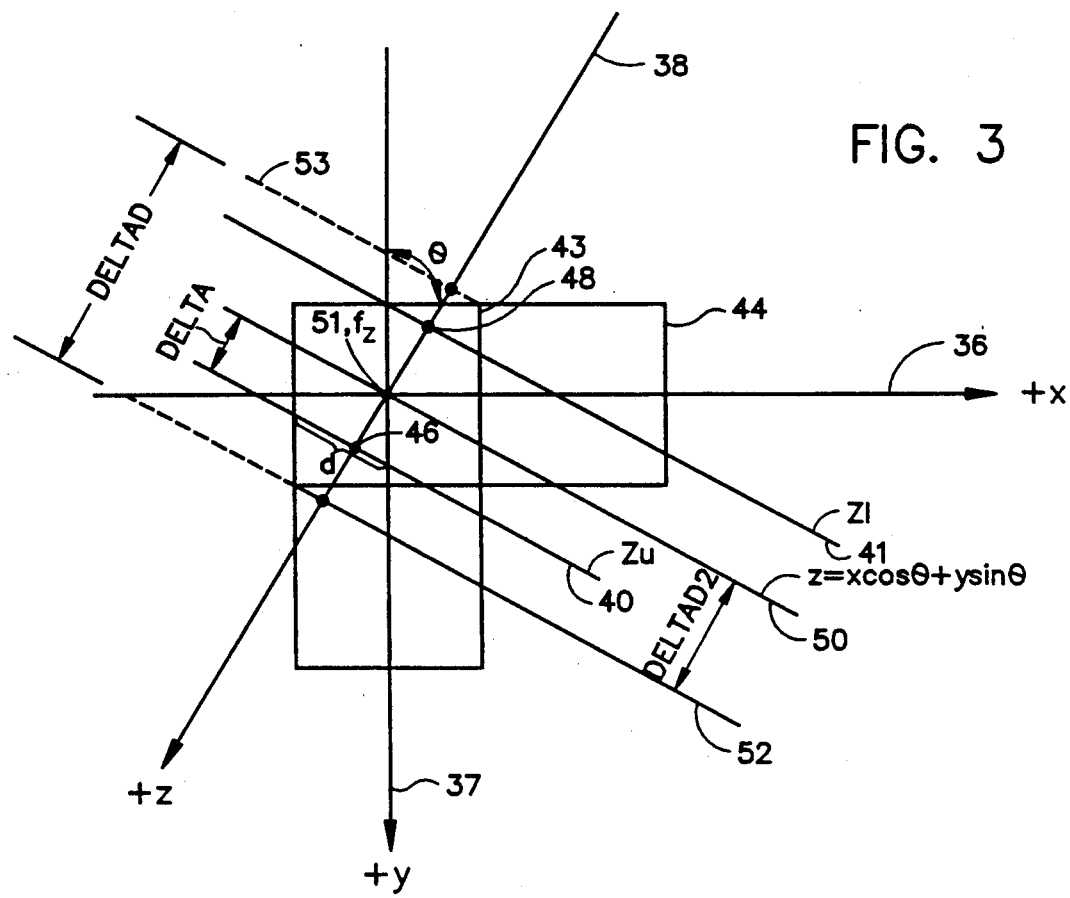
FIG. 3 illustrates projection of a pixel in a digital image onto a Radon projection axis for the purpose of locating rays which intercept the pixel.

In understanding the solution to the bucket finding problem, refer to FIG. 3. In FIG. 3, orthogonal x and y axes 36 and 37 define a two-dimensional area, in which a projection of a digital image is to be generated. A projection axis is indicated by 38. The projection is generated by line integrals taken along rays which include rays 40 and 41. The position of a ray on the axis 38 is indicated by a value for z, where the magnitude of z increases along the axis 38 in the direction from its x- to its y-axis intercept. The digital image to be transformed is in the form of a raster including pixels 43 and 44. Each pixel has a center (x,y). It is observed that one or more rays may intercept a pixel; in FIG. 3, the illustration shows the two rays 40 and 41 intercepting the pixel 43. The "buckets" for the rays 40 and 41 are defined by their respective projection axis intercepts 46 and 48, respectively. The problem, then, is, as the pixel 43 is addressed, to obtain values for the intercepts 46 and 48.

The solution to the bucket finding problem, as just laid out, assumes uniform spacing between the rays 40 and 41, and indeed between all rays which form the projection. The formula of the line 50 going through the center (x,y) of the pixel 43 is given by equation (3), wherein:

$$z = x^*\cos\Theta + y^*\sin\Theta \quad (3)$$

The projection of the center of the first pixel 43 onto the projection axis gives the origin 51 of the axis. If the upper right and lower left corners of the pixel 43 are projected onto the axis 38 as indicated by the projections 52 and 53, the upper and lower intercepts (buckets) 46 and 48 are given by equations (4) and (5), wherein:

$$zu = floor((x-0.5)^*\cos\Theta + (Y+0.5)^*\sin\Theta + z) \quad (4)$$

$$zl = ceil((x+0.5)^*\cos\Theta + (y-0.5)^*\sin\Theta + z) \quad (5)$$

Where the function floor (x) is the greatest integer less than or equal to x and the function ceil (x) is the smallest integer greater than or equal to x. It will be appreciated that equations (4) and (5) provide the uppermost and lowermost buckets for each pixel. This is signified by the nomenclature zu, referring to the uppermost bucket, and zl, referring to the lowermost bucket. Now, with values, and corresponding storage locations, for the uppermost and lowermost buckets, when multiple rays pass through a pixel, their projection axis intercepts and corresponding bucket storage locations are zl, zl+1, . . . , zu. If only one ray passes through the pixel, zl will equal zu.

Figure 4:
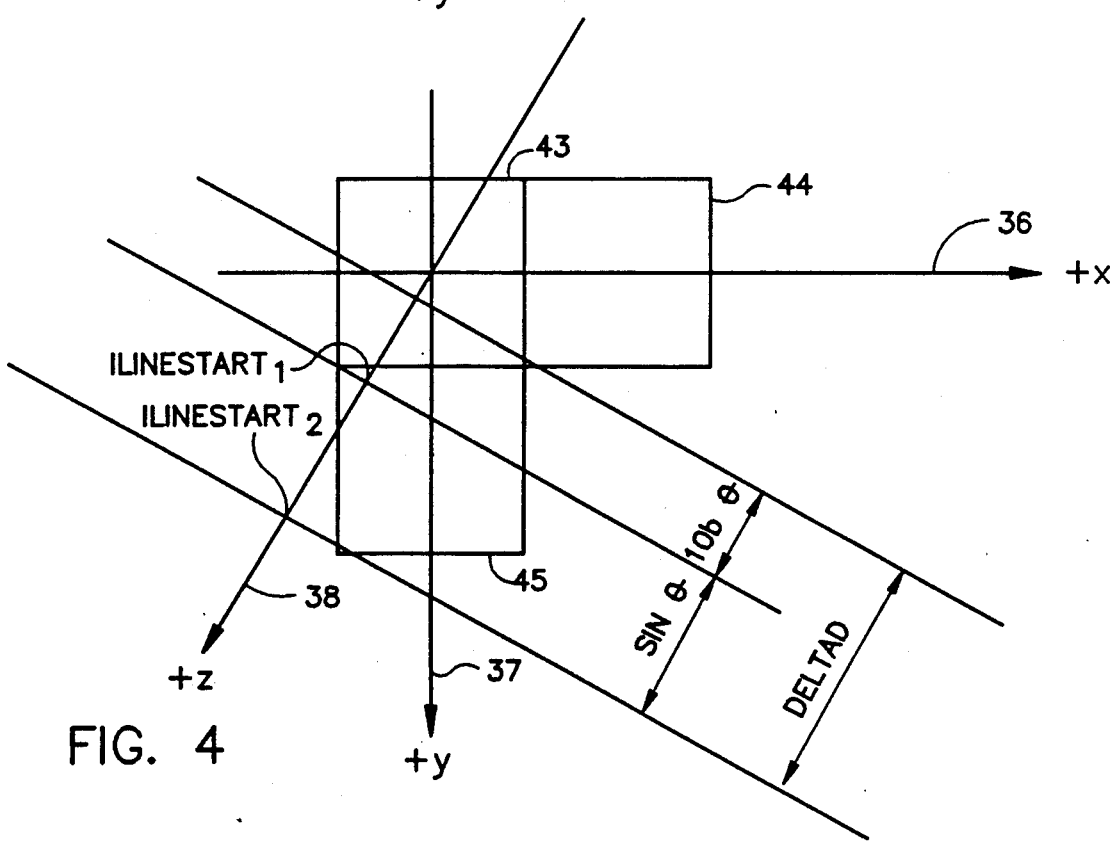
FIG. 4 illustrates projection of a pixel starting point for computing Radon projection axis locations of ray which intercept a pixel.

Referring now to FIG. 4, when the projection 52 of the lower left-hand corner of the pixel 43 is determined, the determined value corresponds to the projection axis intercept of that corner. When calculating the bucket locations of the rays passing through the pixel, this intercept is parameterized as z. Subtracting the z-intercept of the lower left-hand of the pixel 43 from that of the upper right-hand corner of the pixel (refer to FIG. 4), gives the constant $|\cos\Theta| + |\sin\Theta|$ for any fixed angle $\Theta$. The absolute values of the trigonometric functions are used to accommodate quadrants in which either or both of the values are negative. Now, knowing the z-intercept of the projection of the lower left-hand corner of the pixel 43, the z-intercept of the upper right-hand corner is found by simply adding this constant to the intercept 43. This information provides easy determination of the upper and lower buckets that need to be updated by the pixel by using the floor and ceil functions of equations (4) and (5), respectively.

Last, a simple procedure for computing the z-intercept of the lower left-hand corner of each pixel can be appreciated by reference again to FIG. 3. In FIG. 3, a starting point is given by the z-intercept of the projection of the lower left-hand corner of the pixel 43 whose center defines the origin 51 of the projection axis; in this case, the starting point is at the position $$z = \frac{|\cos\Theta| + |\sin\Theta|}{2}.$$

Now the lower left-hand corner of the adjacent pixel 44 is illustrated in FIG. 4 as being separated by the distance $\cos\Theta$ along the projection axis in the lower left-hand corner of pixel 43.

Thus, if the starting point is successively incremented by $\cos\Theta$ whenever the next pixel is provided, the z intercept of the next pixel's lower left-hand corner is obtained by the relationship illustrated in FIG. 4. This procedure can be repeated for all of the pixels along one row of the raster according to the procedure given in Table I.

TABLE I 1. sa = $\frac{|\cos\Theta| + |\sin\Theta|}{2}$ /* starting point */
2. zu = floor(sa) /*this gives the largest bucket that passes through this pel/
3. zl = ceil(sa − |cos⊖| − |sin⊖|)/*this gives the smallest bucket that passes through this pel/
4. output identification z of each bucket intercepting the current pixel, zl ≤ z ≤ zu
5. receive next pixel
6. sa = sa + cos⊖/*now update for the next pel */
7. go to 2

When the last (the right-most) pixel of the current row has been provided and the next row is begun, the procedure of TABLE I can be adapted to save the starting point for each row, that is, the z-intercept for the first left-most) pixel of the row. In this case, all that is needed to obtain the next starting point (see FIG. 4) is to add $\sin\Theta$ to the previous row's starting point. Then, the processing of the next row proceeds as given in TABLE I. Alternatively, the starting point of the next row can be obtained by adding $-N(\cos\Theta + \sin\Theta)$ to the current position when the last pixel of the current row is reached. This assumes, of course, that each row contains exactly N pixels.

Next, the invention provides for finding the length of each ray segment which intercepts the current pixel. When the z-intercept of a ray intercepting the current pixel is known, the line equation for that ray is given by $z = x(\cos\Theta) + y(\sin\Theta)$, where the center of the pixel is (x,y). Knowing that the center of the pixel (x,y) has a z-intercept $x^*\cos\Theta + y^*\sin\Theta$, it is also known that this position always differs from the z-intercept at the lower left-hand corner of the pixel by a fixed amount equal to $$\frac{|\cos\Theta| + |\sin\Theta|}{2}.$$

Figure 5:
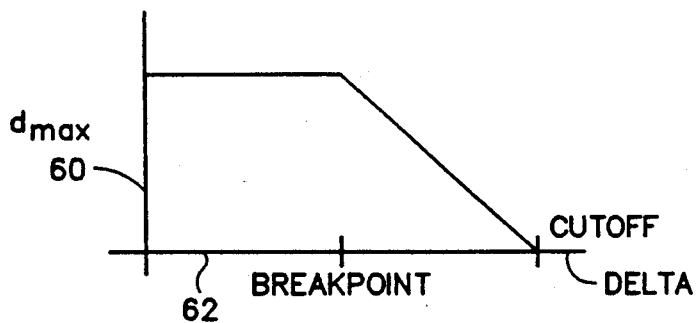
FIG. 5 is a drawing which illustrates parameterization of the length of a ray segment which intercepts a pixel.

Thus, since the procedure for finding ray buckets always knows the z-intercept of the lower left-hand corner of the pixel, a simple add can be used to obtain the z-position of the center of the pixel. In the invention, the length of intersection of a ray with a pixel is parameterized by the distance delta$_1$, shown in FIG. 3 The length of intersection d is a function of $z-\bar{z}$, where z is the projection axis intercept 46 and $\bar{z}$ represents any interger value of z such that $zl \leq \bar{z} \leq zu$. When illustrated graphically, this distance function is symmetric about the origin and has the form illustrated in FIG. 5. In FIG. 5, the vertical axis 60 corresponds to the length of a ray segment which intersects a pixel, while the horizontal axis 62 represents distance from the center of the pixel. In FIG. 5, the distance function is represented by 3 parameters: dmax, breakpnt, and cutoff. These three parameters are functions of the angle $\Theta$, and are fixed for any value of the angle. These parameters are given by equations (6), (7), and (8), wherein:

$$dmax = \frac{1}{MAX(|\cos\Theta|, |\sin\Theta|)} \quad (6)$$

$$breakpnt = \frac{MAX(|\cos\Theta|, |\sin\Theta|) - MIN(|\cos\Theta| - MIN(|\cos\Theta|, |\sin\Theta|)}{2} \quad (7)$$

$$cutoff = \frac{|\cos\Theta| + |\sin\Theta|}{2} \quad (8)$$

With this formulation of the distance finder, it is a simple matter to compute the equation of line between the breakpoint and cutoff values, and to obtain the slope and intercept of the line. It will be evident to those skilled in the art that the distance finder function illustrated by FIG. 5 will never exceed the cutoff value since the rays identified by the buckets zl and zu pass through the pixel. For each integer bucket $\bar{z}$ between zl and zu, then, the distance function of FIG. 5 is evaluated in the invention by using $|z-\bar{z}|$. Consequently, the distance is obtained using the simple procedure of TABLE II, wherein:

TABLE II

| 1. | if $((|z-\bar{z}|) \leq$ breakpnt) then d=dmax |
| 2. | else d = slope*$|z-\bar{z}|$ + intercept |

It is observed that the distance function can be parameterized as a function of the distance from the z-intercept of the lower left corner of the pixel, which will avoid the add to find z. However, in this case, the distance function is no longer symetric about the origin, and would require two tests and two equations to evaluate the distance d. In the preferred embodiment, the procedure of TABLE II is used.

Figure 6:
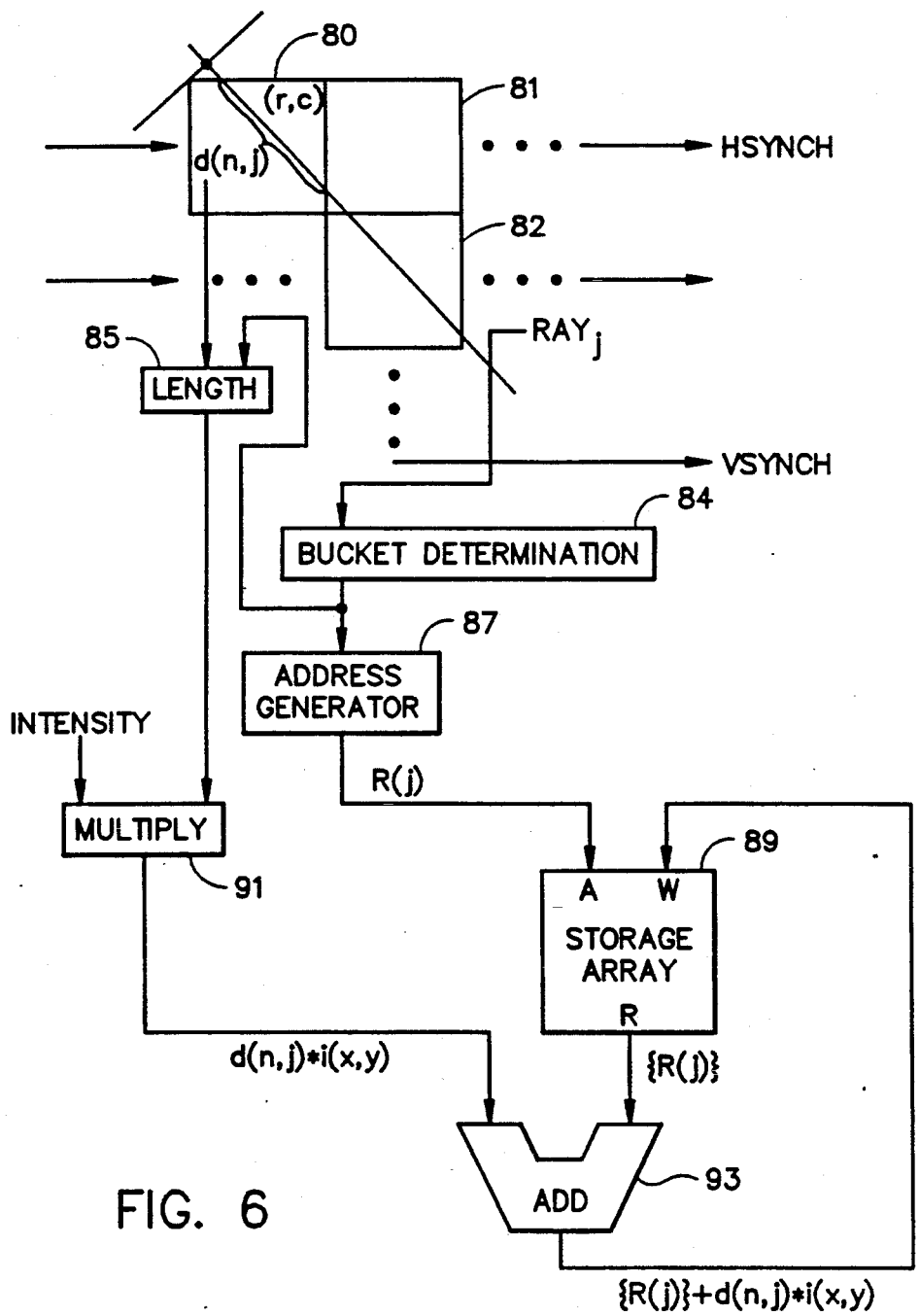
FIG. 6 combines representation of three pixels of a digitized image with a block diagram of processing elements in order to illustrate the practice of the invention.

A basic set of functional components necessary to practice the invention is illustrated in FIG. 6 in combination with three pixels, which are a portion of a raster of pixels containing a digital image. The three pixels 80, 81, and 82 are in two adjacent rows of the raster. The raster is swept from left to right, row-by-row, from top to bottom, with a horizontal synchronization signal HSYNCH activated at the end of each row to signify the beginning of the next row. When the last pixel of the bottom row is reached, a vertical synchronization signal VSYNCH is activated to blank the scanning apparatus while returning the scan to the first pixel of the first row. Each pixel has a column and row designation (c,r); and the pixels of the array are provided either from memory or from a converter at a rate indicated by a pixel clock. Those skilled in the art of digital image processing will appreciate that the HSYNCH, VSYNCH and pixel clock signals are conventional and can be provided by available means.

The invention performs the Radon transform of the digital image represented by the raster of which the pixels 80-82 are a part. The transform obtained is in the form of a projection which is generated by the line integral procedure described above. Thus, for each pixel, the invention determines the intercepting rays (buckets) and the length of ray segments which intercept the pixel. These functions are indicated by figure blocks 84 and 85. The block 84 determines the upper and lower rays, ray u and ray 1, respectively, which correspond to the intercepts zu and zl. The block 84 also determines each ray which intercepts the current pixel as taught above in TABLE I. The block 84 identifies the current ray, $ray_j$, and provides the identification of the current ray to a conventional address generator 87. The address generator 87 converts the identification of the current ray into the storage address R(j) of a register in which the partial sum of the line integral taken along $ray_j$ is being accumulated. The register is contained in a storage array 89, represented in FIG. 6 as an addressable, high-speed storage array which can be accessed in a read-write (RW) cycle. Each of the rays in the projection being generated for a particular value of $\Theta$ has a corresponding register in the storage array 89.

The partial sum for the line integral along $ray_j$ is incremented by first determining the length d(n,j) of the nth segment of $ray_j$ which is the segment of the ray intercepting the pixel 80. The length is determined according to the procedure explained above in connection with FIG. 5, and is provided by the length generator 85. The value calculated for d(n,j) is given, together with the value of the intensity of the pixel 80, to a high-speed multiplier 91, which produces the product of the length of the nth segment of $ray_j$ and the intensity of pixel (x,y). This product is provided, together with the contents of the register R(j) to an adder 93; the output of the adder 93 is stored in the storage array 89 at the address, R(j), of the register which is accumulating the partial sum of the jth ray's line integral.

Figure 7:
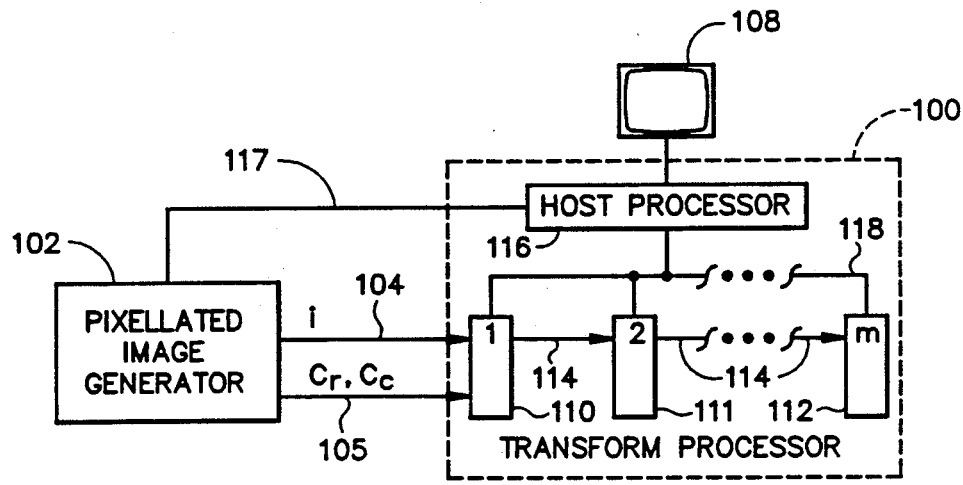
FIG. 7 illustrates a pipeline architecture useful for the practice of the invention.

FIG. 7 illustrates the operational environment in which the invention, represented by FIG. 6, is intended to operate. FIG. 7 corresponds to pipelined parallel processing architecture illustrated and described in the Sanz et al publication cited hereinabove. This structure consists essentially of a transform processor 100 which performs transform processing of a pixellated image provided by a pixellated image generator 102 to process images for display on a conventional display apparatus 108. The pixellated image generator 102 can include a memory which stores and provides a pixellated image in the form of a byte map which is provided in raster-scan format. When so provided, a digital image is presented, pixel-by-pixel, with the intensity i value of each pixel provided on signal path 104. In addition, generator 102 provides conventional pixel signals $C_r$ and $C_c$ on multi-conductor signal path 105 in synchronism with the sequence of pixel intensity values provided on signal path 104. These signals can be simply row and column clocks which identify a pixel by its raster intercepts.

For consistency with the description given above, $C_r$ corresponds to the HSYNCH signal, and pulses once for each raster row. $C_c$ corresponds to the pixel clock.

The pixel sequence provided by the generator 102 is presented to a transform processor pipeline consisting of m stages, three stages being indicated by 110, 111, and 112. The pixels are fed sequentially through the processor pipeline on a pipeline bus 114. Each stage of the processor generates a respective projection used to produce the Radon transform of the image provided by the generator 102. The pipeline configuration of the transform processor means that as the partial sums for the rays intersecting the mth pixel are being updated in stage 110, the partial sum values for the rays intersecting the first pixel in the array are being generated to update the partial sums for those rays in pipeline stage 112. The transform processor includes a host processor 116 which communicates with the image generator 102 on a communications path 117, and which is connected to the processor pipeline stages on a host bus 118. The host processor 116 generates the values of $\Theta$ for the projections to be generated, and obtains the projections, when completed, to conduct the desired processing in Radon space. The processing result is provided by the host processor to the display apparatus 108 for display of the processed digital image.

Figure 8:
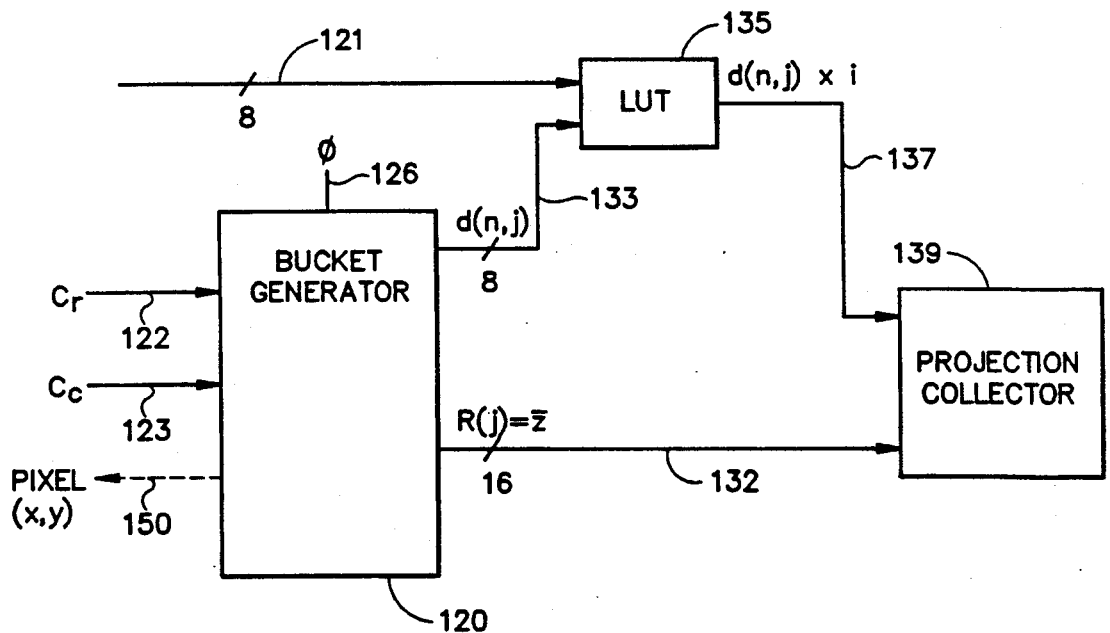
FIG. 8 is a block diagram illustrating the structure of a pipeline stage.

FIG. 8 illustrates the components of one stage of the processor pipeline in the transform processor 100, these components being necessary to the practice of this invention. The stage architecture illustrated in FIG. 8 is understood to apply to each of the stages in the processor pipeline of the transform processor 100. Stage architecture includes a bucket generator 120 which receives the $C_r$ and $C_c$ signals on signal lines 122 and 123. The bucket generator 120 also receives the value $\Theta$ on signal line 126. In response to the input signals, the bucket generator 120 operates according to TABLES I and II, and employs the distance estimating procedure explained above in connection with FIG. 5 to produce two signals. The first signal provided is the identification of the current ray in terms of its z-intercept, denoted in FIG. 8 as $\bar{z}$. As explained above, for the current ray, ray$_j$, the ray's z-intercept, $\bar{z}$, corresponds to the bucket, or address R(j) of the register which contains the partial sum of the line integral for the ray. This value is provided as a 10-bit word on signal line 132. Last, the bucket generator provides, as an 8-bit word, the magnitude value d (n,j) for the length of the nth segment of ray$_j$, which is the segment of the ray which intersects the current pixel.

The architecture of FIG. 8 also includes a lookup table (LUT) which receives an 8-bit word corresponding to the intensity value i of the current on signal 121, and which also receives the 8-bit word on signal line 133. The LUT 135 is conventionally configured to perform look-up multiplication of the values provided to it on signal lines 121 and 133, providing, in response, their product on signal line 137.

Last, a projection data collector 139 operates in a manner equivalent to a gray-level hardware histogrammer with an addressable storage space capable of storing and updating the values of the partial sums for all of the rays forming the projection being generated at the stage. Projection collector 139 is capable of updating its registers at a rate which is a multiple of the pixel clock rate. Updating consists of obtaining the contents of the register R(j), incrementing them by the value on signal line 137, and storing the incremented value at register R(j).

TABLE III illustrates the functional characteristics of a bucket generator and lookup table in source C language which can be used to generate the programming necessary to configure the bucket generator and lookup table as illustrated in FIG. 8. In the illustration of Table III it is assumed that the pipeline stages of the transform processor are program modules which are executed in parallel by the transform processor. The illustration of TABLE III computes the projection of an arbitrary-sized digital image at any value of $\Theta$, using fixed point arithmetic.

To adapt the bucket finding procedure of TABLES I and II, it is necessary to adapt the equations (4) and (5) for fixed point numbers. Since any number y is represented as a rational functional $y = x/2^B$ (which is fixed point notation, where B is the number of fractional bits and is referred to as the "binary point"), it is straightforward to implement the floor and ceil functions using simple logic primitives. Advantage is taken of the fact that if all all fractional bits are masked, the floor function is given by floor(x)-x&-($2^B$), where & denotes the bit-wise logical AND operation. Thus adapted, the floor implies that floor(x)/$2^B$ is an integer. Since the buckets always correspond at the integer values, such bit masking is unnecessary, and the desired integer-valued bucket can be obtained by simply examining the higher order bits of the bucket value. The ceil function is obtained by incrementing slightly less than an integer step and subjecting the results to the floor function. Thus, ceil(x)=floor(x+$2^B$-1).

Next, the parameters of the floating point procedure are converted to a fixed point representation. This is a simple process since sine and cosine are limited to values between ±1. The fixed point version of the bucket finding procedure is identical to the floating point except for the fact that normal two's complement integer arithmetic is used. It is recognized that the fixed point bucket finding procedure may select the wrong bucket due to roundoff error. In this case, the incorrect bucket will be updated. Furthermore, the degrading effect of this will be data dependent since the updated amount is a function of the pixel value. The bucket finder will make more mistakes near the end of a line due to the cumulative roundoff error of adding an approximate increment. For these reasons, it is best to use an adequate number of bits in the fixed point representation.

To convert the distance finder to a fixed point procedure, it is necessary to simply represent the parameters dmax, cutoff, breakpnt, slope, and intercept, in fixed point, and use fixed point arithmetic. It is recognized that implementation of the distance finder and the fixed point arithmetic may introduce error due to roundoff. However, the effect of a roundoff error in the distance finder, assuming selection of the correct bucket, would result in the bucket being incremented by a slightly smaller or larger value. Those skilled in the art will recognize that this is not as serious an error as incrementing the wrong bucket, as would result from a miss in the bucket finder. Therefore, fewer bits are required in the distance finding computation than in the bucket finding computation. This has the advantage of reducing the size of the operands to be multiplied, which makes practical the implementation of the multiplication as a table look-up operation, as illustrated in FIG. 8.

Turning now to TABLE III, this illustration of the bucket finder 120 and LUT 135 receives image pixels, in raster scan sequence from a pixelated image source including a byte map in which image pixels are stored at addressable locations and read out in raster sequence.

TABLE III

| | |
|---|---|
| 100 | define DTOR_$\pi$/180.0 |
| 101 | #define dbits 8 |
| 102 | #define bbits 16 |
| 103 | hproj (picture, theta, pdata) |
| 104 | IMAGE*picture; |
| 105 | double theta; |

TABLE III-continued

```
106   int *pdata;
107   {
108   int    wd,ht,npoints,i;
109   PEL8   *pixel;
110   int    offset, x, y;
111   int zl;/*lower bucket number passing thru a pel*/
112   int zu;/*upper bucket number passing thru a pel*/
113   double cs,sn;/*sin and cosine of the angle
114   double d;   /*the distance the projection passes
              through the pel*/
115   double delta; /*the distance from the bucket to the
              projection of the center of the pixel
116   double dmax;/*max d of a projection through a pixel */
117   double cutoff;/*beyond cutoff d is zero */
118   double slope; /*slope of region where d is linearly
              decreasing */
119   double breakpnt; /* point where d start to decrease */
120   double intercept; /*intercept of linear region of d */
121   double sa ; /*counter on projection axis */
122   double linestart; /*counter on projection axis */
123   double deltad; /*the distance the pel projects on the
              projection axis */
124   double fz; /*pixel center maps the projection here */
125   double tmax, tmin;/*some temps*/
126   int ics,isn,id,idelta,idmax,idelta2,isa;
127   int ilinestart,ideltad,ifz
128   int bscale;/*the fixed point scale for the bucket
              finder*/
129   int dscale;/*the fixed point scale for the distance
              computer*/
130   int taddr; /*table address*/
131   double pel; /*used to build the table */
132   static int table [65535]; *table to do multiplies and
              lookup*/
133   wd = SM(*picture);
134   ht = LN(*picture);
135   npoints = (int)(sqrt((double)(wd*wd + ht*ht)));
136   npoints ++;
137   for(i=0;i<npoints;i--)pdata[i]=0.0;
138   cs = cos(theta*DTOR);
139   sn = sin(theta*DTOR);
140   deltad = fabs(cs) + fabs(sn);
141   tmax = MAX(fabs(cs),fabs(sn));
142   tmin = MIN(fabs(cs),fabs(sn));
143   dmax = 1.0/tmax;
144   cutoff = deltad*.5;
145   breakpnt = (tmax − tmun)*.5;
146   slope = 0.0;
147   intercept = 0.0;
148   if(breakpnt<cutoff)slope = dmax/(breakpnt − cutoff);
149   intercept = .slope*cutoff;
150   bscale = 1<<bbits;
151   dscale = 1<<dbits;
152   ics = bscale*cs +.5;
153   isn = bscale*sn +.5;
154   ideltad = bscale*deltad +.5;
155   ideltad2 = bscal*cutoff +.5;
156   /*build the table - low 8 bits are the pel value*/
157   /*high 8 bits are the distance parameter*/
158   i = 0;
159   for(delta = 0.0;delta<dscale;delta +=1.0)
160   for(pel=0.0;pel<256.0;pel+=1.0){
161   if (delta/dscale<=breakpnt)d = dmax;
162   else d = slope*delta/dscale+intercept;
163   table[i++]=(int)(d*pel*255.0/361.0+.5;
164   }
165   pixel = PA8(*picture,0,0);
166   if(theta>90.0)offset=(int)ceil(((wd-0.5)*cs-0.5*sn));
167   else offset = 0;
168   for(y=0,ilinestart=ideltad2;y<ht;y++,ilinestart+=isn){
169   for(isa = ilinestart,x+0;x<wd;x++,isa+=ics) {
170   ifz = isa − ideltad2;
171   zu = isa>>bbits;
172   zl = (isa − ideltad+bscale-1)>>bbits;
173   for(i=zl;i<+zu;i++){
174   idelta=ABS((i<<bbits)−ifz);
175   /*convert to new fixed point representstion*/
176   idelta = idelta>>(bbits−dbits);
177   /*generate lookup table address*/
178   taddr = (*pixel)|(idelta<<8);
179   pdata[i-offset] += table[taddr];
180   }
181   pixel++;
182   }
183   }
184   }
```

In TABLE III, steps 100–102 provide for conversion of the angle Θ into radians and define a constant dbits equal to the number of fractional bits used in a distance finder which represents ray segment length, and a constant, bbits, equal to the number of fractional bits used to represent a bucket. Entry point for the procedure is step 103. The inputs to the program are the image and angle Θ; the output (pdata) is the product comprising the segment length of the current ray and the intensity of the current pixel.

Variable definitions are given in steps 108–112, with statements 111 and 112 defining the lower and upper buckets for the current pixel, respectively. Other variable definitions are given in statements 113–125. These definitions are explained with reference to FIG. 3. Statement 114 defines d as the segment length of the current ray (zu, for example) passing through the current pixel. Statement 115 defines a variable "delta" corresponding to the distance between the projection axis intersection of the current ray and the intercept of the center of the current pixel. In FIG. 3, this is illustrated between intercepts 46 and 51. Statements 117–120 define variables explained above with reference to FIG. 5. The variable sa in statement 121 is a fixed point counter corresponding to the projection axis intercept of the lower left-hand corner of the current pixel on the projection axis. The variable linestart is the intercept on the projection axis of the lower left-hand corner of the first pixel in the current raster row. In FIG. 3, taking pixel 43 as the first pixel in its row, the values for sa and linestart are equal when the pixel 43 is being processed. When processing moves to pixel 44, the value sa is updated to project the lower left-hand corner of the pixel 44 onto the axis 38. The variable deltad corresponds to the sum of the absolute values of the sine and cosine of Θ, as illustrated in FIG. 3 and 44. A variable deltad2 is equal in magnitude to one half the value of deltad; it represents the distance on the projection axis between the intercept of the lower left, or upper right corner of a pixel and the projection of the center of the pixel. The center of the pixel is mapped to the projection axis by the variable fz (statement 124).

Statements 127–130 define variables used to scale the values of variables defined in previous statements to obtain their fixed point values.

The lookup table 135 of FIG. 8 is defined essentially in statements 130–132. It is noted that the double precision value of the current pixel (double pel) is used to build the LUT, and that the table stores 65,535 addressable words, each corresponding to a respective ray segment length/pixel intensity product.

Statements 133–137 perform a unit transformation from the pixel dimensions of the image in the xy universe to the bucket units on the projection axis. Here, the number of buckets is set equal to the length of the hypotenuse drawn between opposing corners of the pixelated image matrix, in statement 135. In statement 137, the output to the projection collector for each bucket (bucket (i)) is initialized to zero.

Next, the values necessary to parameterize all of the possible ray segment length values according to FIG. 5 are computed in steps 138-149.

In statements 150 and 151, the fixed point representations for the bucket finder (bscale) and the ray segment length (dscale) are scaled for fixed point representation. Statements 152 and 153 scale the cosine and sine values for break point and cutoff calculation in connection with FIG. 5. Similarly, statements 154 and 155 scale the deltad and deltad2 parameters for fixed point operation.

Next, in statements 156-164, the lookup table 135 is constructed for all of the possible products of an 8-bit pixel intensity value and all of the integer values for ray segment length which are included in FIG. 5 as scaled in steps 150-155.

The bucket generator is given in steps 165-184. In this portion of TABLE III, it is assumed that the pixel image generator consists of a stored byte map of the image being transformed, in which pixels are stored in a sequential manner corresponding to the raster sequence, with each addressable location in the sequence containing an 8-bit representation of pixel intensity. The bucket generator takes the address of the starting pixel in statement 165, defines an angle offset in statements 166 and 167, and begins bucket identification in statement 168.

In the bucket identification process, the origin of the xy universe, the origin of the projection axis, and the center of the first pixel in the raster are aligned. For a clearer understanding, as illustrated in FIG. 3, when x and y are both 0, the intersection of the lower left-hand corner of the pixel 43 with the projection axis is given by the distance deltad/2. The current value of this parameter identifies the row of the current pixel. When the end of the row is reached, the beginning of the next row (that is, the projection of the lower left-hand corner of the first pixel in the next row onto the projection axis) is given by incrementing the current value of linestart by isn, the fixed point value of the sine of $\Theta$. The pixels in the current row of the matrix are counted in statement 169, wherein the parameter isa is the projection of the lower left-hand corner of the current pixel onto the projection axis. This value is incremented by ics, the fixed point value of the cosine of $\Theta$ when the pixel is updated. In statement 170, the projection axis location of the center of the current pixel is calculated by subtracting deltad2 from the current value of isa, following which the upper and lower buckets for the current pixel are identified in statements 171 and 172. Statements 173 and 174 constitute a loop identifying each bucket contained in the range between the upper and lower buckets identified in statements 171 and 172. For each bucket in the range, the distance on the projection axis between the bucket and the center of the pixel idelta is calculated in the statement 174, converted to fixed point representation in statement 176, and concatenated with the pixel intensity in statement 178 to generate an address for the lookup table.

At this point, it is instructive to reconsider how the lookup table was constructed. Returning now to statement numbers 159-165, the table is constructed to store at each table address taddr, the product of a length of ray segment and a pixel image intensity. As the discussion above with reference to FIG. 5 will confirm, the parameter idelta implicitly gives the value of the ray segment. Therefore, the address form from the current values of image intensity and idelta give the product for the ray segment corresponding to that value of idelta and the current image intensity. In statement 179, the identification of the current bucket (pdata[i-]), and the ray segment/intensity product (table[taddr]) is output to the projection collector. Statement 180 returns to statement 173 for the next bucket. When the last bucket for the current pixel is processed (i=zu), the (x,y) address of the pixel is incremented. Statement 182 loops back to statement 169 to update the value of isa, the projection of the lower left-hand corner of the next pixel onto the projection axis. This loop is exited when the value of x equals the width (wd) of the raster matrix. Statement 183 loops back to statement 168 for updating to the next line. This loop operates until the y value for the current pixel equals the value of the height (ht) of the pixel matrix.

Statement 184 signifies the end of the procedure.

Figure 9:
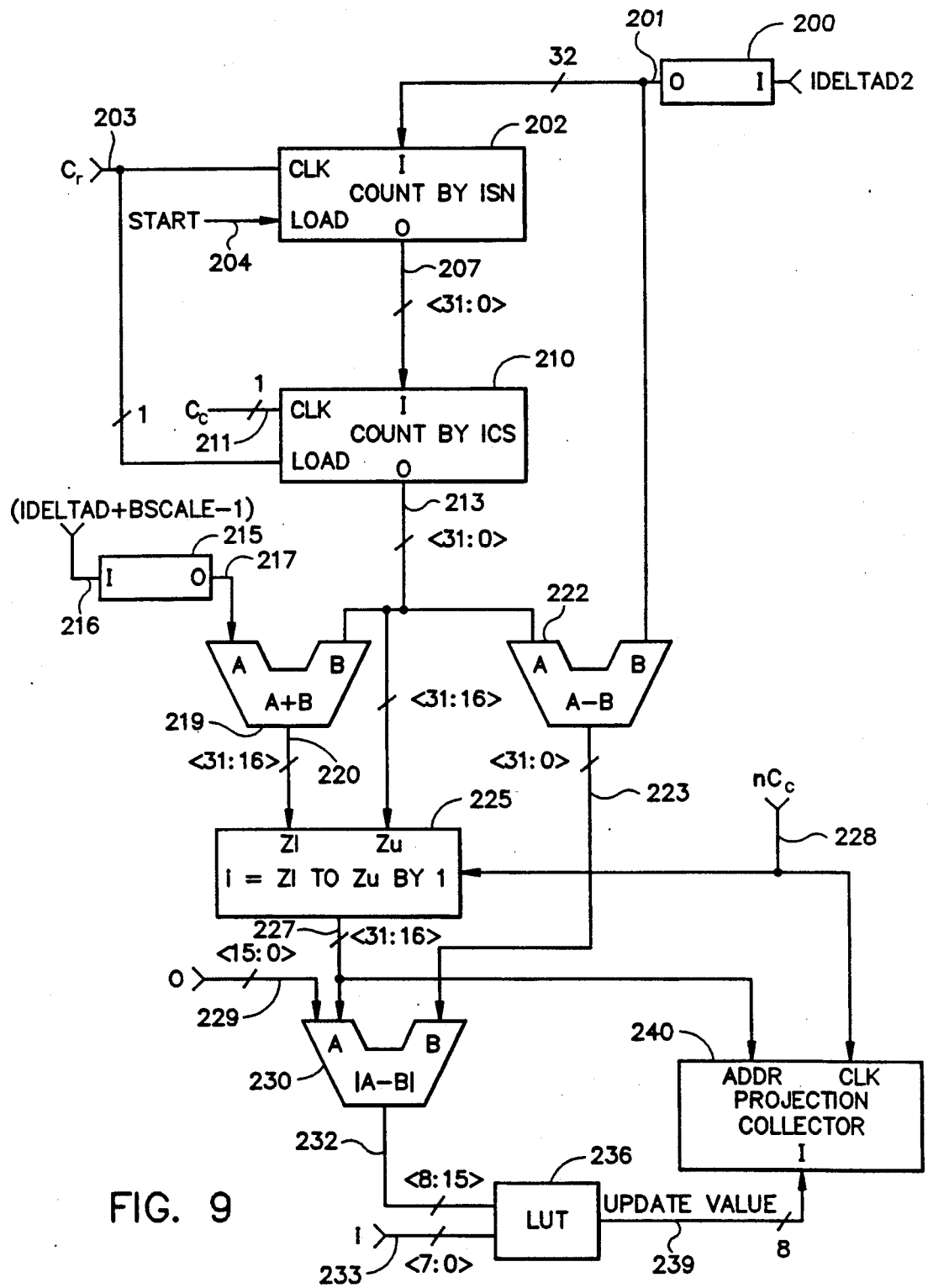
FIG. 9 is a block diagram illustrating the pipeline stage of FIG. 8 in more detail.

Refer now to FIG. 9 for hardware embodiment of the invention. FIG. 9 assumes that the transform processor 110 of FIG. 7 is a multi-CPU processor in which each processor stage operates in parallel with all of the other stages. Accordingly, FIG. 9 illustrates the stage architecture of FIG. 8 in the form of a hardware processor which receives the pixel data including row and column clocks and pixel intensity from the image generator. The stage processor of FIG. 9 receives, from the host processor 116, a START signal, the value of the lookup table for the projection being calculated at angle $\Theta$, as well as the values ideltad2 and (ideltad+bscale−1). Last, the stage processor receives a multiple of the column clock, designated as $nC_c$.

The stage processor of FIG. 9 includes a 32-bit register 200 having an input I which receives a value for the parameter ideltad2 from the host processor 116. The output port 0 of the register 200 is provided on a 32-bit signal line 201 to a counter 202 which is, preferably, a 32-bit, count-by-n counter with preload. The counter 202 is clocked by the row clock $C_r$ on signal line 203 and loads the contents of the register 200 in response to the START signal on signal line 204. The current 32 bit count of the counter 202 is output on signal 207, which is connected to the input I of a second 32-bit, count-by-n counter 210, which is preloaded by the row clock $C_r$. Counter 210 is clocked by the column clock $C_c$ provided on signal line 211. The 32-bit output of the counter 210 is provided on signal line 213. A 32-bit register 215 receives and stores the value (ideltad+bscale-1) on signal line 216 and provides the value on signal line 217 to a 32-bit adder 219. The adder 219 receives the contents of the register 215 on its A input and the output of the counter 210 on its B input. The adder 219 provides the sum (A+B) of the values received on its inputs. The output is provided on signal line 220 which comprises only the 16 most significant bits of the sum.

A 32-bit subtractor 222 receives the output of the counter 210 at its A input and the contents of the register 200 on its B input. The subtractor 222 subtracts the magnitude of B from the magnitude of A and provides the difference as a 32-bit signal on signal line 223. An incrementing circuit 225 receives the 16-bit sum on signal line 220 and also receives the 16 most significant bits generated by the counter 210 on signal line 226. The incrementing circuit 225 increments by 1 the value on signal line 220 in response to the clock signal $nC_c$ on signal line 28 until it reaches the value on signal line 226. The output of the incrementing circuit 225 is provided as a 16-bit signal on signal line 227. These 16 bits are concatenated at the A input of a 32-bit subtractor 230 with the 16 bits on signal line 229 set to the value zero.

The B input of the subtractor 230 receives the difference signal on signal line 223. The subtractor 230 subtracts the magnitude provided to its B input from the magnitude provided at its A input, and outputs the absolute value of A-B. This absolute value is provided as an 18-bit signal on signal line 232. The 18-bit signal on signal line 232 is concatenated with the pixel intensity signal I on signal line 233 to form the address input of a lookup table (LUT) 236. The lookup table 236 comprises a 64k-by-8 memory whose contents are as described above in connection with the lookup table built in Table III. A projection collector 240, corresponding to the projection collector described above receives an update address from the signal line 227, an update value from the output of the lookup table 236 on signal line 239 and the accelerated column clock $nC_c$.

The operation of the circuit of FIG. 9 commences with the loading of the registers 200 and 215 with the values ideltad2 and (ideltad+bscale-1), respectively. The initial value of ideltad2 is the projection of the lower left-hand corner of the first pixel of the first row in the raster on the projection axis. In Table III, this is the initial value of ilinestart. In FIG. 4, this projection is indicated by $ilinestart_1$. Once each cycle of hhe row clock $C_r$, the counter 202 increments its current value by the integer value of the sine of $\Theta$, isn. As explained above in connection with FIG. 4, this gives the projection of the lower left-hand corner of the first pixel in the next row following the one just completed.

The counter 210 receives the output of the counter 202 at the beginning of each raster row. As explained above in connection with FIG. 3 and 4, this value corresponds to the projection of the lower left-hand corner of the first row pixel on the projection axis. This value is incremented once each cycle of the column clock $C_c$ by the fixed point value of the cosine of $\Theta$, ics, to obtain the projection axis location of the next pixel in the row. This is illustrated in FIG. 4.

The adder 219 adds, to the projection axis location of the lower left-hand corner of the current pixel, an offset (ideltad+bscale-1). This computes the ceil function to find the lower bucket, zl, by the fixed point floor function discussed above.

The floor function to find zu is performed, essentially, by truncating the 32-bit values for the projections of the lower left- and upper right-hand corners of the current pixel. Therefore, only the most significant 16 bits of signal line 213 and the output of the adder 219 are provided to the incrementing circuit 225. The most significant 16 bits of the 32 bit number representing the lower left-hand corner are taken as the representation of zu, while the most significant 16 bits of the representation of the upper right-hand corner are taken as the representation for zl. The incrementing circuit 225 responds to these two values in its operation.

In operation, the incrementing circuit 225 calculates a new value for the loop parameter i once each cycle of $nC_c$. The count is started at the representation for zl and stops when the value for zu is reached. Thus, the incrementing circuit 225 outputs, once each cycle of $nC_c$, the current bucket as an 8-bit update address.

The subtractor 222 subtracts the constant value idelta2 from the projection axis location of the lower left-hand corner of the current pixel to produce projection axis location of the pixel's center, denoted as fz in FIG. 3 and ifz in Table III.

The subtractor 230 provides the distance "delta" shown in FIG. 3 (idelta in Table III) by its indicated operation on the pixel center and the bucket i being processed. The value of delta is obtained from the most significant 8 bits of the result produced by the subtractor 230. These 8 bits are concatenated with the 8 bits representing the pixel intensity at the address input of the lookup table 236 to obtain the update value in the form of the ray segment length/pixel intensity product, which is provided as an update value on signal line 239.

Figure 10:
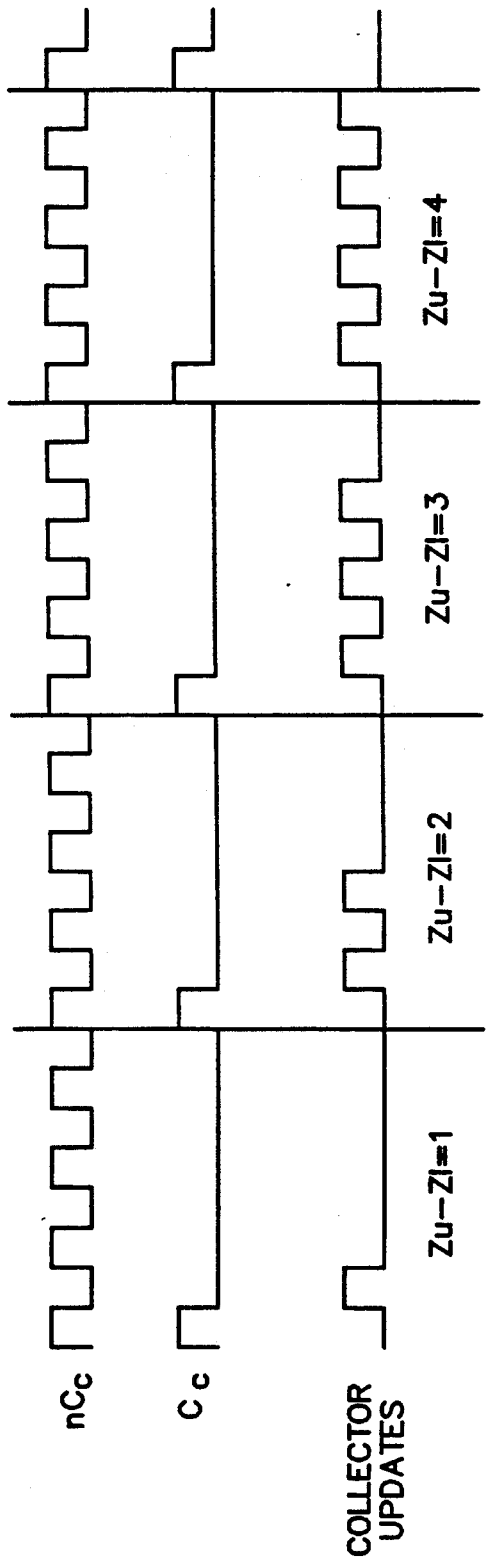
FIG. 10 is a timing diagram.

The projection collector 240 operates in response to the multiplied column clock, $nC_c$. The operation of the projection collector is synchronized as illustrated in FIG. 10 for a maximum of four updates per pixel. This means that the number of rays which intersect any given pixel at the prescribed orientation varies from 1 to 4. It will be evident to those skilled in the art, therefore, that the multiple clock $nC_c$ must have a frequency which can clock the maximum number of possible updates. In this case with a maximum of four updates per pixel, the accelerated clock is While we have described several preferred embodiments of our Radon transform apparatus, it should be understood that modifications and adaptations thereof will occur to persons skilled in the art. Therefore, the protection afforded our invention should only be limited in accordance with the scope of the following claims.

We claim:

1. An apparatus for performing a Radon transform of a digital image represented by a raster scan signal including an array of pixels by constructing a Radon projection of said image at a projection angle $\Theta$, said apparatus including:

projection storage determination means responsive to said array of pixels for determining, for each pixel, a projection storage location for each of a plurality of Radon projection rays which intersect said pixel, a particular projection storage location, zu, being determined by combining z with $\Theta$ according to:

$$zu = floor((x-0.5)* \cos \Theta + (y+0.5)*\sin) + z)$$

where floor (w) is the greatest integer less than or equal to w, and x,y corresponds to the location of the center of the pixel in the array of pixels;

length determining means connected to the projection storage determination means and responsive to the array of pixels for determining the length of each ray of said plurality of rays;

multiplication means connected to the length determining means and responsive to the array of pixels for multiplying each determined length by an intensity of said pixel to produce a product;

a storage array containing a plurality of storage locations and addressed by said projection storage determination means for storing at each storage location a partial ray value; and addition means connected to the multiplication means and to the storage array for combining the product produced by the multiplication means with the partial ray value stored at the particular projection storage location to produce an updated partial ray value and replacing the partial ray value with the updated partial ray value at the particular projection storage location.

2. In a system including display means for displaying an image in raster form, array generator means connected to the display means for producing an array of picture elements (pixels) representing the raster image, and a processing means for performing a Radon transform of a digital image represented by the pixel array, the processing means including a storage means having a storage mechanism with a plurality of projection storage locations, each projection storage location being identified and accessed by a storage location address, a method for constructing a Radon projection of said image at a projection angle $\Theta$ in the storage means, the method including the steps of:

(a) providing said array of pixels to said processing means in row order;

(b) in said processing means, for each pixel in said array of pixels:

(b1) determining a reference location z on an axis which corresponds said Radon projection with said array of pixels, said reference location corresponding with a row of said array of pixels which contains said pixel;

(b2) determining a storage location address, zu, defining a projection storage location in said storage means by combining z with $\Theta$ according to:

$$zu = floor((x-0.5)*\cos\Theta + (y+0.5)*\sin\Theta + z)$$

where, floor (w) is the greatest integer less than or equal to w, and x,y corresponds to the location of the center of said pixel in said array of pixels, said projection storage location address zu corresponding to a ray of said projection which intersects said pixel;

(b3) determining a length of the portion of said ray which is contained in said pixel;

(b4) combining said length with an intensity magnitude of said pixel to obtain a ray segment value; and (b5) combining said ray segment value with a partial ray value stored at the projection storage location corresponding to said address and storing the result at said projection storage location as an updated partial ray value; and, then (c) assembling said projection by accumulating in said projection storage locations the updated partial ray values for the pixels in said array of pixels.

3. The method of claim 2:

wherein step (b2) further includes determining a projection storage location, zl, by combining z with $\Theta$ according to:

$$zl = ceil((x+0.5) x\cos\Theta + (y-0.5)*\sin\Theta + z)$$

where ceil(w) is the smallest integer greater than or equal to (w), said storage location zl corresponding to a ray of said projection which intersects said pixel;

between step (b2) and step (b3), identifying a plurality of projection storage locations, each of said projections storage locations corresponding to one of a plurality of rays which intersect that pixel, and each of said projections storage locations identified by a respective integer of the set zl, zl+1 ..., zu; and performing steps (b3)–(b5) for each ray of said plurality of rays.

* * * * *

UNITED STATES PATENT AND TRADEMARK OFFICE
CERTIFICATE OF CORRECTION

PATENT NO. : 5,136,660
DATED : August 4, 1992
INVENTOR(S) : Flickner et al

It is certified that error appears in the above-identified patent and that said Letters Patent is hereby corrected as shown below:

Column 18, lines 26 and 27, please change "projections" to --projection--; and

Column 18, line 29, please change "projections" to --projection--.

Signed and Sealed this

Twelfth Day of October, 1993

Attest:

BRUCE LEHMAN

Attesting Officer

Commissioner of Patents and Trademarks